United States Patent [19]

Granberg

[11] Patent Number: 5,174,173
[45] Date of Patent: Dec. 29, 1992

[54] ROUND FILE HOLDER FOR A CHAIN SAW SHARPENER

[76] Inventor: Elof Granberg, 15 Harbor View Ct., San Rafael, Calif. 94901

[21] Appl. No.: 774,602

[22] Filed: Oct. 10, 1991

[51] Int. Cl.5 .................... B23D 63/10; B23D 71/04
[52] U.S. Cl. .............................................. 76/36; 29/80
[58] Field of Search ................... 29/78, 80; 76/31, 36

[56] References Cited

U.S. PATENT DOCUMENTS

| | | | |
|---|---|---|---|
| 2,515,469 | 7/1950 | Power | 29/80 |
| 2,818,752 | 1/1958 | Granberg | 76/31 |
| 3,518,900 | 7/1970 | Ehlen et al. | 76/36 |
| 4,864,897 | 9/1989 | Newman | 76/31 |
| 5,042,127 | 8/1991 | Lamas | 29/80 |

Primary Examiner—William E. Terrell
Attorney, Agent, or Firm—Bruce & McCoy

[57] ABSTRACT

An improved round file holder having guide rails along the edges thereof for use in conjunction with a chain saw filing guide for sharpening chain saws and having a pair of identical stringer secured together to support the files from the ends thereof and held together by an adjustable fastener to accommodate different diameter files.

8 Claims, 4 Drawing Sheets

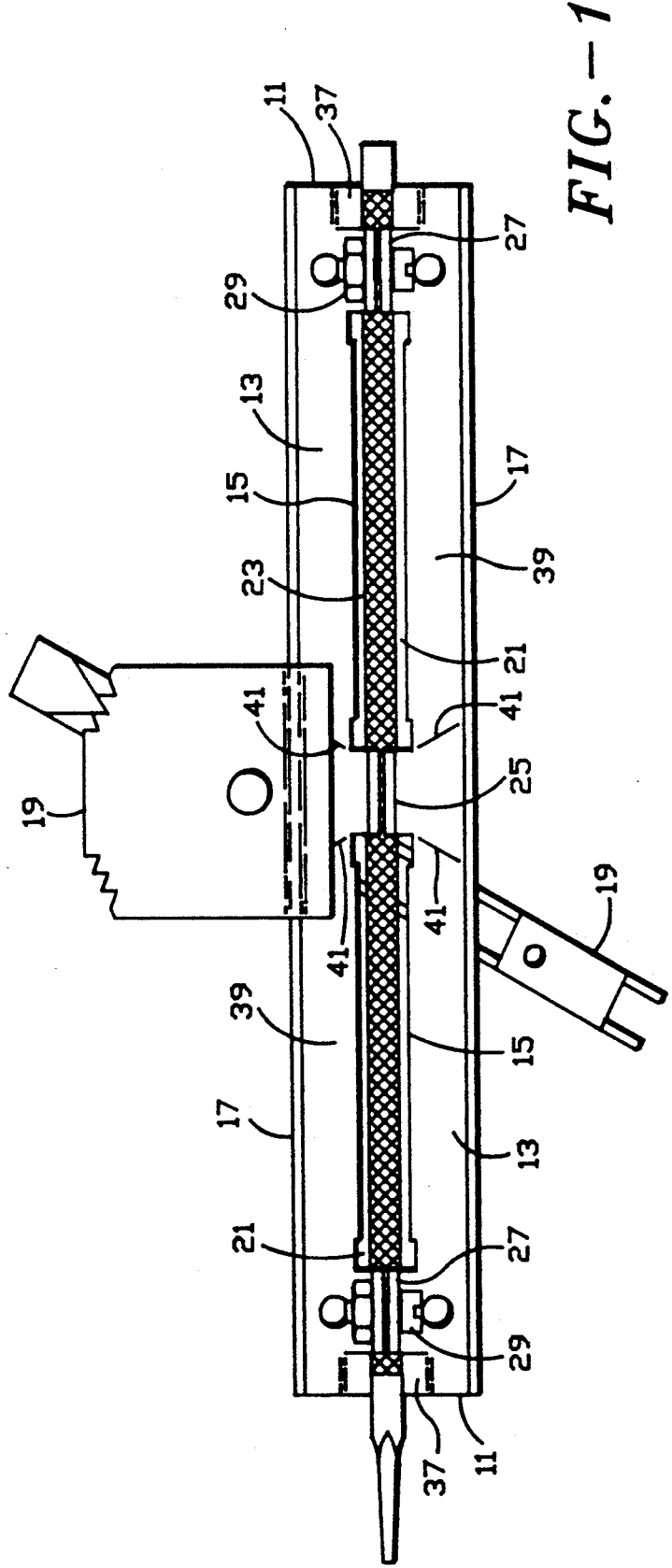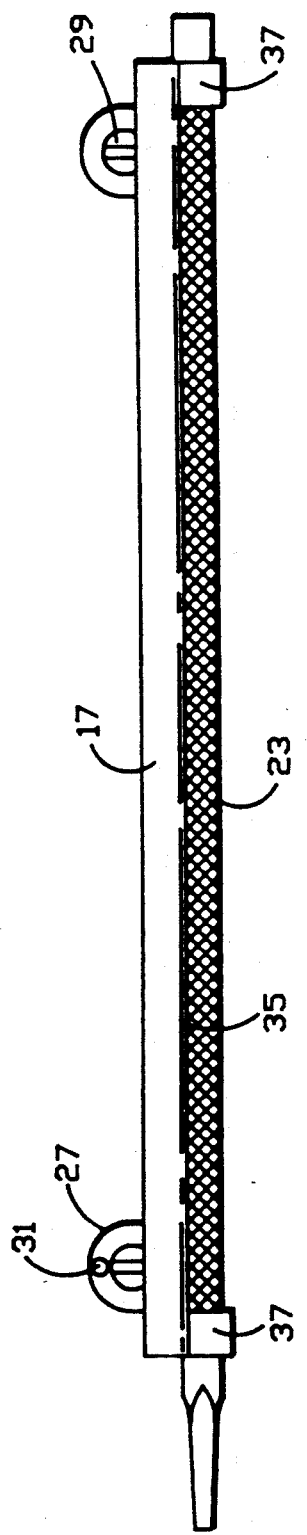

ROUND FILE HOLDER FOR A CHAIN SAW SHARPENER

BACKGROUND OF THE INVENTION

1. Field of the Invention

The present invention relates to chain saw sharpening tools and more particularly to a round file holder for use with a chain saw sharpening guide that is operated by engaging the guide with the chain saw cutter bar and the saw chain that is to be sharpened and guiding the file holder during the sharpening process by maintaining the proper angulation of the file secured in the holder with respect to the blade surfaces of the cutter teeth of the saw chain.

2. Description of the Prior Art

Many devices have been developed to assist in the sharpening of chain saws. The principal objective of these sharpening devices is to grip the saw chain and orient the sharpening file with respect to the blade surfaces of the cutter teeth which comprise the chain and maintaining the proper angulation during the sharpening stroke of the file. The file must be angulated in the horizontal plane with respect to the leading or cutting edge of the cutter tooth because the cutting edge is raked with respect to the forward movement of the tooth and the cutter bar of the chain saw.

Thus, attempts by a person to sharpen a saw chain cutter tooth free hand, without the aid of a guide or gauge, are usually ineffective because it cannot be done accurately even by those with a great deal of experience. It is simply too difficult to hold both particular angles accurately for free hand sharpening. The problem is especially exacerbated since the angles must be reversed for each successive tooth as they alternate in their rake and slope with respect to the forward direction of the chain. Almost every person has a preferable orientation for stroking a file, usually depending upon whether they are right handed or left handed, whereby changing orientation to the less preferred angulations causes the file to not be as accurately tracked during the filing stroke as compared with the individual's preferred orientation for manipulating the file.

In order to overcome these problems, many devices have been designed o provided for aiding in the sharpening of saw chains. One particular design which is both simple and effective is described in U.S. Pat. No. 4,864,897 to Charles Newman for a Chain Saw Sharpening Tool issued Sep. 12, 1989. Described therein is a chain saw sharpening tool which includes a channel section having a generally square inverted U-shaped cross-section with a pair of side walls and a connecting wall forming the top of the channel. The channel section is formed for mounting over a saw chain installed in a cutter bar and having an opening formed in the top of the channel section through which the individual teeth of the saw chain can be sharpened. A pair of studs project from the top of the channel adjacent to the opening. The first of the studs is a pivot post for a file guide and the other of the studs is a locator pin. A file holder having a guide means formed along both edges of the holder parallel to the disposition of a file in the holder is provided for engaging a file holder guide. The file holder guide is mounted on the pivot post of the channel section and is formed for engaging the guide means of the file holder. The guide also has locator holes for engaging the locator pin which projects from the channel section. The channel section is placed over the top of the saw chain mounted in the cutter bar of the chain saw. The file holder is engaged with the file holder guide and the guide is oriented with respect to the saw chain by means of the locator pins which engage the file holder guide at the correct position. The file and holder are then reciprocated in their engagement with the file holder guide to sharpen the individual cutter teeth of the saw chain over which the tool has been located.

The problem with the apparatus disclosed in the above-identified '897 patent is that the file holder can only accommodate on diameter file. It is not adaptable to different diameter files for filing different gauge cutting teeth on different sized saw chains. The present invention provides a unique file holder which is readily adaptable to different diameter round files and which can be used with the filing guide disclosed in the '897 patent as well as the improved guide disclosed herein.

More uniquely, the round file holder of the present invention is made from two identical pieces of punched and bent flat steel plate which are arranged in mirror image opposed orientation. The single configuration can be used for both halves of the device, greatly reducing the manufacturing costs, and by its adaptability to different diameter round files, provides a versatility which greatly expands the utility of the filing guide.

SUMMARY OF THE INVENTION

The present invention is an improved round file holder for various diameter files for use in conjunction with a chain saw filing guide for sharpening chain saws. The holder includes a pair of identical longitudinal stringers having extended flat body portions juxtaposed in mirror image facing relation with opposed edges facing each other and with outer edges which can be engaged with a filing guide formed for mounting on a chain saw cutter bar and saw chain whereby the file holder can be reciprocated in the guide at a preset angulation with respect to the cutter bar and chain to sharpen the teeth of the chain.

A first pair of vertically upward projecting tabs are disposed on the opposite edges of the stringers proximate the ends thereof and are formed for accepting a fastening means for securing the stringers together. One of the tabs includes a projecting bearing surface disposed at the upper end thereof for contacting the opposing tab above the position of the fastening mean which extends between the tabs for securing the stringers together whereby each of the opposing tabs are separated a finite distance by the bearing surfaces.

Guide rails are formed on the outer edges of the stringers for engaging the filing guide and permitting reciprocation therein in a captured relation to provide accurate tracking of the file secured in the holder with respect to the guide and any saw chain and cutter bar it is mounted on.

A second pair of tabs are disposed at opposite ends of the stringer adjacent to the first tabs and project downward from the body portion of the stringer in the opposite direction from the first pair of tabs. The second tabs are angled with respect to the main body portion of the stringers whereby a round file is captured between the second pair of tabs and the body portion of the stringers at the ends thereof when the two stringers of the file holder are secured together by the fastening means.

An adjustable fastening means is provided for securing the first tabs together with an adjustable connection whereby the opposing edges of the stringers can be angulated toward and away from each other pivoting on the bearing surfaces whereby different diameter files can be accommodated by and secured in the file holder.

OBJECTS OF THE INVENTION

It is therefore an important object of the present invention to provide a file holder for a saw chain sharpener which can accommodate various diameter round files.

It is another object of the present invention to provide a round file holder for a chain saw filing guide which is constructed purely of bent and punched flat sheet metal which can be secured together by common nuts and bolts.

And it is a further object of the present invention to provide an improved round file holder for a chain saw filing guide which is made of two identical pieces for economical manufacture.

Other objects of the present invention will become apparent when the description of the preferred embodiment thereof is considered in conjunction with the accompanying drawings.

BRIEF DESCRIPTION OF THE DRAWINGS

FIG. 1 is a top plan view of the round file holder of the present invention mounted in a chain saw filing guide in operative position;

FIG. 2 is a side elevation thereof; and

DESCRIPTION OF THE PREFERRED EMBODIMENT

Figure 3:
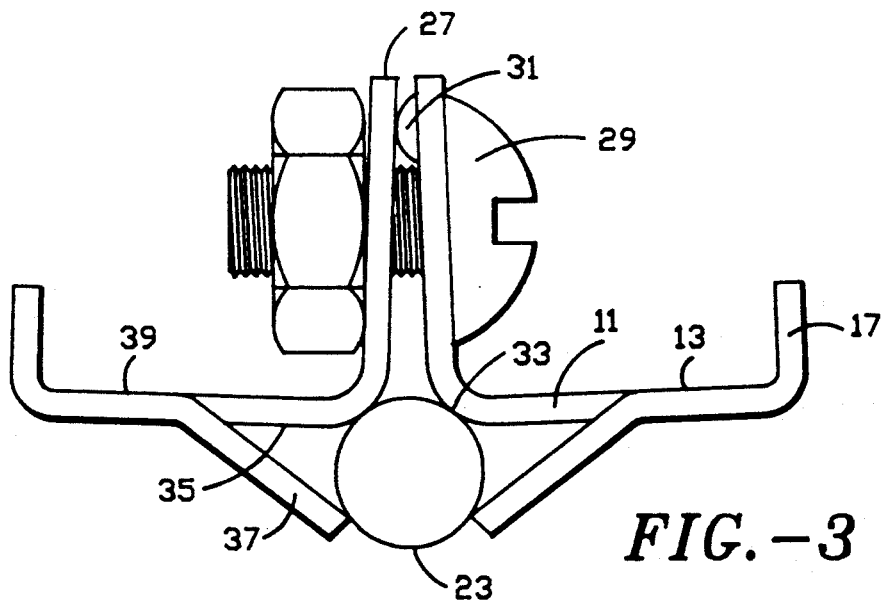
FIGS. 3-5 are end elevations in cross-section of the round file holder of the present invention showing the alternative positioning of the two halves of the file holder when different diameter round files are secured therein.

The present invention is an improved round file holder for various diameter files for use in conjunction with a chain saw filing guide for sharpening the cutter teeth of chain saws. Reference is made to the drawings wherein like reference numbers represent like elements on corresponding views.

The preferred embodiment of the present invention illustrated in FIGS. 1 and 2 is designed for use with various diameter files and is made from a pair of identical longitudinal stringers 11 juxtaposed in mirror image facing relation. The stringers are formed of integral pieces of bent and punched sheet metal and have extended flat body portions 13 with opposed edges 15 which face each other in the assembled file holder. The outer edges 17 of the stringers can be engaged with a filing guide 19 designed for mounting on a chain saw cutter bar and saw chain. The engagement of the file holder with the filing guide permits the file holder to be reciprocated in a sliding relation within said guide at a preset angulation with respect to the cutter bar and saw chain to sharpen the cutter teeth of the chain.

The stringer body portion 13 disposed along the opposed edges is cut away 21 toward the outer edges for portions of the length thereof to prevent mechanical interference with the file 23 to be secured in said holder. The center portions 25 of the stringers along the opposing edges instead of being cut away can be left in extended position and bent upwards whereby the center portions form strengthening tabs which bear against the file 23 midlength therealong, irrespective of the angulation of the stringers with respect to each other, whereby the file is given support against bending at its midspan.

A first pair of vertically upward projecting tabs 27 are disposed on the opposed edges 15 of the stringers 11 proximate the ends thereof. They are formed for accepting an adjustable fastening means 29 for securing the stringers together. The tabs are formed by bending ears formed on the sheet metal body portion upward at 90° with respect to the body portion with a particular radius of curvature. One of the first tabs includes a projecting bearing surface 31 in the form of a pimple disposed at the upper end thereof for contacting the opposing tab above the position of the fastening means which extends between the tabs. As a result, each pair of opposing first tabs are separated a finite distance by the bearing surfaces when two identical stringers are placed in mirror image juxtaposed position: the single bearing surface on each tab provides a pair of bearing surfaces in the assembled holder.

The body portion 13 of the stringer 11 at the juncture where the first tabs 27 are bent upward 90° therefrom forms two of the contact surfaces 33 for the file 23 at the curved surfaces where the file bears against the holder. The radius of curvature for the bend of the tabs on the stringers is selected so that one-fifth of the diameter of the circular cross section of the file 23 is located above the lower surface 35 of the stringers.

Figure 5:
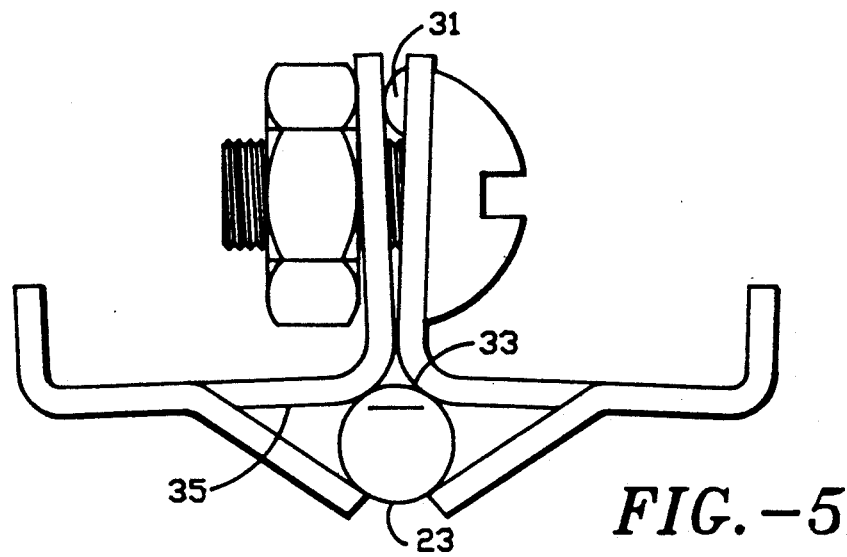
Figure 6:
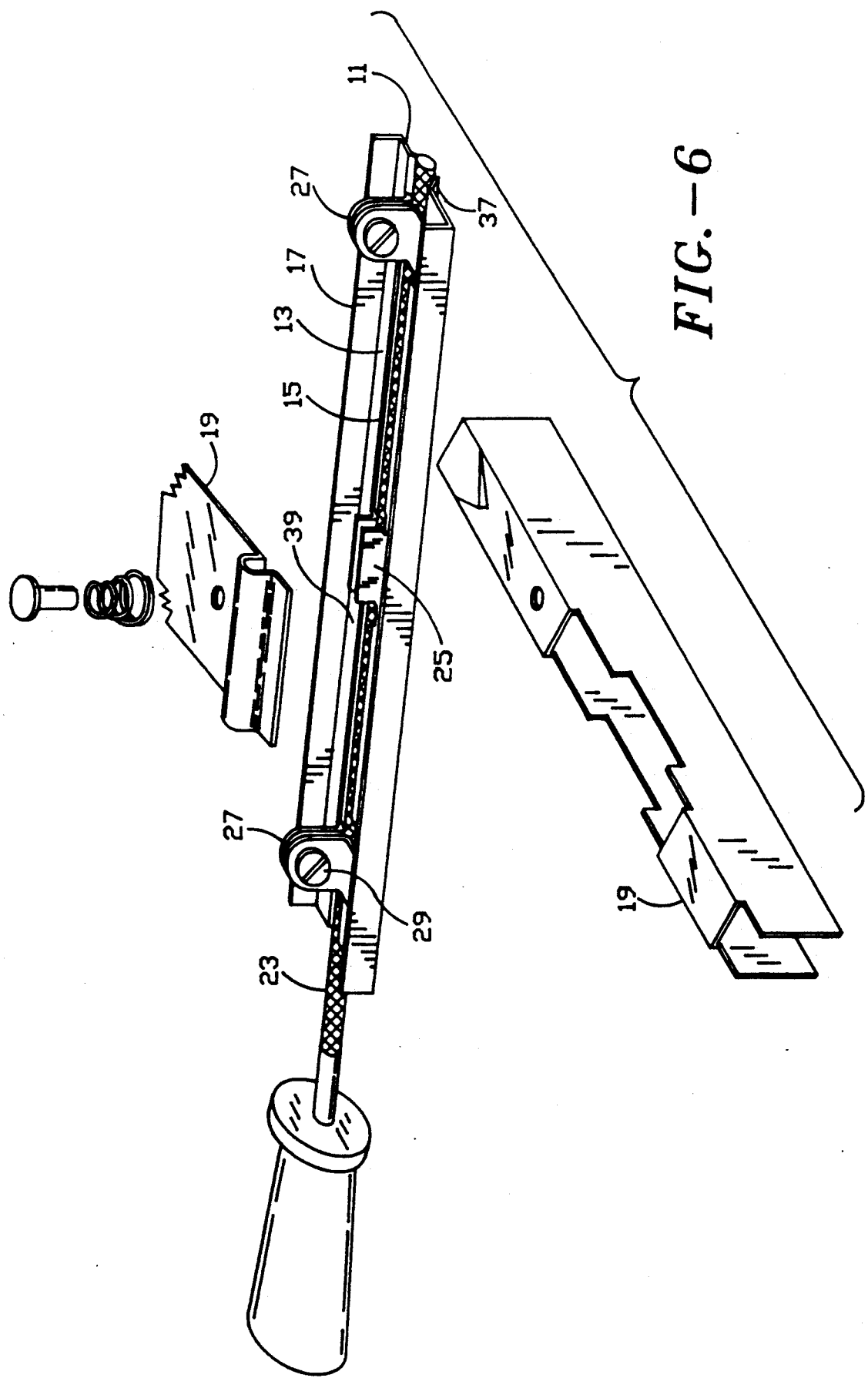
FIG. 6 is an exploded perspective view of the present invention in use.
Figure 7:
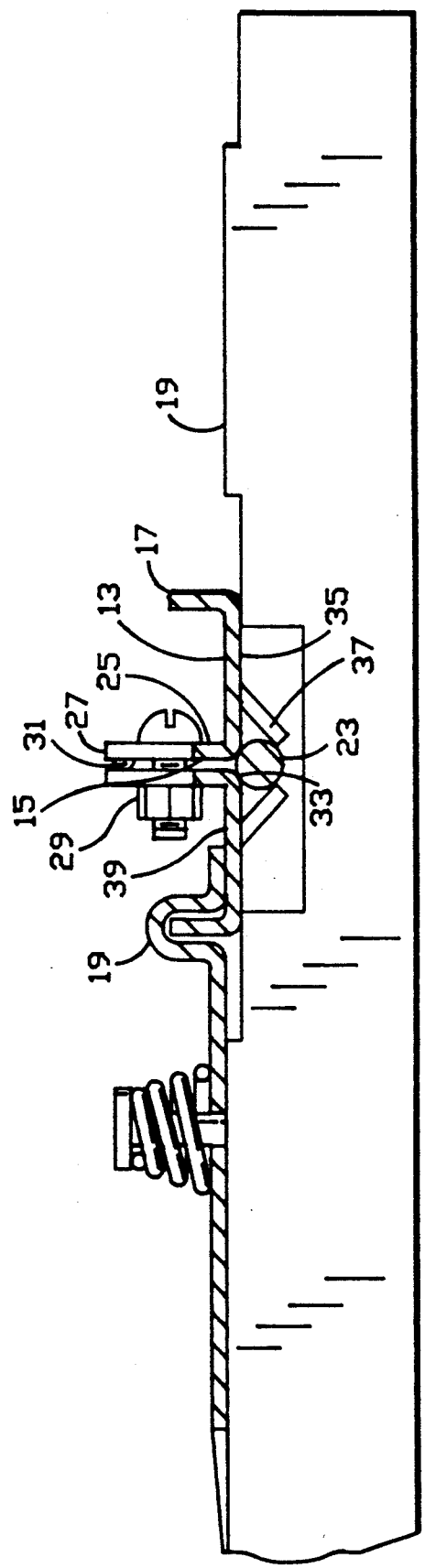
FIG. 7 is a sectional view of the present invention in use.

Reference is made to FIG. 5 wherein a line has been drawn on the end view of the file denoting the one-fifth of the diameter of the file 23 which projects above the bottom surface of the stringers 11.

The radius of curvature of the tabs 33 is dependent upon the selected height or projecting distance of the bearing surface 31, but the determining criteria is to maintain one-fifth of the file cross-section height above the top surface of a saw chain cutting tooth. The center portions 25 have the same curvature as the first tabs where they are bent up from the stringer body portion 13.

Guide rails 17 are formed on the outer edges of the stringers 11 for engaging the filing guide 19 and permitting reciprocation therein in sliding captured relation to provide accurate tracking of a file 23 secured in the holder with respect to the guide and any saw chain and cutter bar it is mounted on. The guide rails are formed of a flat flange of uniform height which extends for the length of the stringers and is disposed at 90° with respect to the elongated body portion. The guide rails are formed by bending a flat straight outer edge of the stringer at right angles to the body portion thereof. In addition to performing the function of acting as guide rails, the flanges provide structural strength to the assembly for supporting the file without deformation.

A second pair of tabs 37 is disposed at opposite ends of the stringer adjacent to the first tabs 27 and project downward from the body portion 13 of the stringer 11 in the opposite direction from said first pair of tabs. The second tabs are angled approximately 45° with respect to the main body portion of the stringers whereby a round file 23 is captured between the second pair of tabs and the body portion of the stringers at the ends and center thereof when the two stringers of the file holder are secured together by the fastening means 29. The second tabs are formed on the stringer by bending a portion of each end of the metal stringer downward from the body portion of the stringer. It is immaterial which of the first and second tabs are at the end or inboard, but the illustrated configuration with the relative proximity of the two sets of tabs at the end of the stringer provides the longest length of useable file surface for sharpening cutter teeth.

Figure 4:
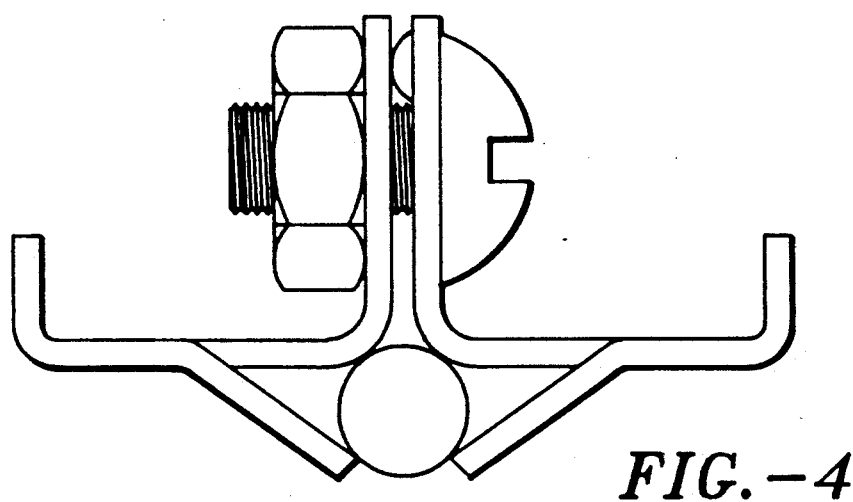

An adjustable fastening means 29 is provided for securing the first tabs 27 together with an adjustable connection whereby the opposing edges 15 of the stringers 11 can be angulated toward and away from each other pivoting on the bearing surfaces 31 whereby different diameter round files 23 can be accommodated by and secured in the file holder as shown in FIGS. 3-5. The fastening means includes a common nut and bolt which can be adjusted to accommodate different diameter round files by pulling the two stringers together or allowing them to be separated depending upon the diameter of the file grasped between the first and second tabs. Changing the length of the fastening means by tightening or loosening the nut and bolt cause the stringer to pivot on the bearing surfaces relative to each other to increase or decrease the circular cross-section of the files which can be accommodated between the first and second tabs.

The top surface 39 of the stringers can be imprinted with angulated markings 41, in the form of lines, at the center thereof for aligning the side of a file 23 disposed in the holder with the saw chain cutting tooth that is to be sharpened. As a result, the file holder can be reciprocated in a fairly accurate track and thereby used without the filing guide 19 for free hand sharpening of a saw chain in an emergency.

Thus, it will be seen from this description of the preferred embodiment of the present invention that the improved round file holder disclosed and described herein achieves the objects and advantages attributable thereto, and while the invention has been described in considerable detail, it is not to be limited to such details as has been set forth except as may be necessitated by the appended claims.

I claim:

1. An improved round file holder for various diameter files for use in conjunction with a chain saw filing guide for sharpening chain saws comprising a pair of identical longitudinal stringers having extended flat body portions juxtaposed in mirror image facing relation with opposed edges facing each other and with outer edges which can be engaged with a filing guide designed for mounting on a chain saw cutter bar and saw chain whereby said file holder can be reciprocated in said guide at a preset angulation with respect to said cutter bar and chain to sharpen the teeth of said chain, a first pair of vertically upward projecting tabs disposed on the opposed edges of said stringers proximate each of the ends thereof and formed for accepting a fastening means for securing the stringers together, one of said tabs of each pair including a projecting bearing surface disposed at the upper end thereof for contacting the opposing tab above the position of the fastening means which extends between the tabs for securing the stringers together whereby each pair of opposing tabs are separated a finite distance by said bearing surfaces, guide rails formed on the outer edges of said stringers for engaging said filing guide and permitting reciprocation therein in captured relation to provide accurate tracking of a file secured in said holder with respect to said guide and any saw chain and cutter bar it is mounted on, a second pair of tabs disposed at opposite ends of said stringers adjacent to each said first fair of tabs and projecting downward from the body portion of said stringers in the opposite direction from said first pair of tabs, said second tabs being angled with respect to the main body portion of said stringers whereby a round file is captured between the second pair of tabs and the body portion of said stringers at the ends thereof when the two stringers of the file holder are secured together by the fastening means, and an adjustable fastening means 29 for securing said first tabs together with an adjustable connection whereby the opposing edges of the stringers can be angulated toward and away from each other pivoting on said bearing surfaces whereby different diameter round files can be accommodated by and secured in said file holder.

2. The improved round file holder of claim 1 wherein said stringers and tabs are formed from a single piece of bent and punched sheet metal and said second tabs are formed on each said stringer by bending a portion of each end of the sheet metal stringer downward at an angle less than 90° to the body of said stringer and said first tabs are formed by bending ears formed on said sheet metal body portion adjacent to said second tabs upward at 90° with respect to said body portion.

3. The improved round file holder of claim 2 wherein said second tabs are bent at an angle of approximately 45° to said stringer body portion and said body portion along the opposed edges is cut away toward said outer edges between said tabs except for a portion along the opposed edges proximate the center thereof.

4. The improved round file holder of claim 1 wherein the guide rails are formed of a flat flange of uniform height which extends for the length of said stringers disposed at 90° to the body portion thereof and the fastening means are a nut and bolt which can be adjusted to accommodate different diameter round files.

5. The improved round file holder of claim 1 wherein the contact surfaces for the file against the holder in addition to the second tabs include the body portion of the stringer at the juncture where said first tabs are bent upward 90° therefrom.

6. The improved round file holder of claim 1 wherein said stringers are provided with angulated markings at the center thereof for aligning the side of a file disposed in the holder with the saw chain cutting tooth that is to be sharpened whereby the file holder can be used without the filing guide for free hand sharpening of a saw chain.

7. An improved round file holder for various diameter files for use in conjunction with a chain saw filing guide for sharpening chain saws comprising a pair of identical longitudinal stringers formed of integral pieces of bent and punched sheet metal and having extended flat body portions juxtaposed in mirror image facing relation with opposed edges facing each other and with outer edges which can be engaged with a filing guide designed for mounting on a chain saw cutter bar and saw chain whereby said file holder can be reciprocated in said guide at a preset angulation with respect to said cutter bar and chain to sharpen the teeth of said chain, said stringer body portion along the opposed edges being cut away toward said outer edges between the ends of said stringers except for a portion along the opposed edges proximate the center thereof, a first pair of vertically upward projecting tabs disposed on the opposed edges of said stringers proximate each of the ends thereof and formed for accepting a fastening means for securing the stringers together, said tabs being formed by bending ears formed on said sheet metal body portion upward at 90° with respect to said body portion, one of said tabs of each pair including a projecting bearing surface disposed at the upper end thereof for contacting the opposing tab above the position of the fastening means which extends between the tabs for securing the stringers together whereby each pair of opposing tabs are separated a finite distance by said bearing surfaces, said body portion of the stringer at the juncture where said first tabs are bent upward 90° therefrom forming the contact surfaces for the file against the holder, guide rails formed on the outer edges of said stringers for engaging said filing guide and permitting reciprocation therein in captured relation to provide accurate tracking of a file secured in said holder with respect to said guide and any saw chain and cutter bar it is mounted on, said guide rails being formed of a flat flange of uniform height which extends for the length of said stringers disposed at 90° with respect to the body portion thereof, said guide rails being formed by bending a flat straight edge of said stringer at right angles to the body portion thereof, a second pair of tabs disposed at opposite ends of said stringers adjacent to each said first pair of tabs and projecting downward from the body portion of said stringers in the opposite direction from said first pair of tabs, said second tabs being angled approximately 45° with respect to the main body portion of said stringers whereby a round file is captured between the second pair of tabs and the body portion of said stringers at the ends thereof when the two stringers of the file holder are secured together by the fastening means, said second tabs being formed on each said stringer by bending a portion of each end of the sheet metal stringer downward from said body portion of said stringer, and an adjustable fastening means for securing said first tabs together with an adjustable connection whereby the opposing edges of the stringers can be angulated toward and away from each other pivoting on said bearing surfaces whereby different diameter round files can be accommodated by and secured in said file holder, said fastening means including a nut and bolt which can be adjusted to accommodate different diameter round files.

8. The improved round file holder of claim 7 wherein said stringers are provided with angulated markings at the center thereof for aligning the side of a file disposed in the holder with the saw chain cutting tooth that is to be sharpened whereby the file holder can be used without the filing guide for free hand sharpening of a saw chain.

* * * * *